United States Patent
Dittus et al.

(10) Patent No.: US 7,659,482 B2
(45) Date of Patent: Feb. 9, 2010

(54) ADAPTER CARD ELECTROMAGNETIC COMPATIBILITY SHIELDING

(75) Inventors: Karl Klaus Dittus, Durham, NC (US); Michael John Stowell, Morrisville, NC (US); Joel Edwin Walker, Raleigh, NC (US); Jean Jidong Xu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/107,635

(22) Filed: Apr. 22, 2008

(65) Prior Publication Data

US 2009/0260870 A1    Oct. 22, 2009

(51) Int. Cl.
*H05K 9/00* (2006.01)

(52) U.S. Cl. .................. 174/354; 174/355; 174/369; 174/382; 361/679.4; 361/816

(58) Field of Classification Search .......... 174/354, 174/355, 369, 371, 385, 382; 361/816, 818, 361/679.4
See application file for complete search history.

(56) References Cited

U.S. PATENT DOCUMENTS

| | | | | |
|---|---|---|---|---|
| 5,204,496 A | * | 4/1993 | Boulay et al. ............... | 174/355 |
| 5,679,923 A | * | 10/1997 | Le .............................. | 174/372 |
| 6,058,025 A | * | 5/2000 | Ecker et al. ................. | 361/816 |
| 6,608,758 B1 | | 8/2003 | Hunt et al. | |
| 6,618,271 B1 | * | 9/2003 | Erickson et al. ............. | 361/818 |
| 6,822,879 B2 | * | 11/2004 | Rathnam et al. ............ | 361/818 |
| 6,946,598 B1 | | 9/2005 | Konshak | |
| 7,112,740 B2 | | 9/2006 | Van Haaster | |
| 7,170,013 B2 | | 1/2007 | Lewis | |
| 2007/0139904 A1 | | 6/2007 | English et al. | |
| 2007/0284141 A1 | | 12/2007 | Sosnowski | |

* cited by examiner

*Primary Examiner*—Hung V Ngo
(74) *Attorney, Agent, or Firm*—Cynthia G. Seal; Jeffrey L. Streets

(57) ABSTRACT

An electromagnetic shield comprising an electrically conductive frame for establishing electrical contact between a chassis wall and an expansion card mounting bracket. The frame has a plurality of spring fingers interconnected about a perimeter of a central opening in the frame, wherein each spring finger defines a central axis that extends outwardly away from the central opening. The frame may include a substantially planar portion adjacent the central opening in the frame, wherein the plurality of spring fingers incline along the central axis to extend out of the plane defined by the substantially planar portion. The incline of the spring fingers allows a mounting bracket to slide laterally without jamming against the side of a spring finger during installation, removal or side-to-side shifting of the mounting plate.

20 Claims, 3 Drawing Sheets

ADAPTER CARD ELECTROMAGNETIC COMPATIBILITY SHIELDING

BACKGROUND OF THE INVENTION

1. Field of the Invention

The present invention relates generally to electromagnetic compatibility shielding.

2. Background of the Related Art

Electromagnetic interference (EMI) is an electrical noise that creates a disturbance, or an undesired response in electrical circuits, equipment, or systems. Many types of commercial electronic equipment, such as computers and transmitters are a source of electromagnetic emissions. Most sources primarily produce electromagnetic (E) field emissions. Most conductive materials have low impedance and therefore reflect most of the E field waves.

Electromagnetic compatibility (EMC) is the extent to which a piece of hardware will tolerate electrical interference from other equipment, in other words, the ability of a device or system to function without error in its intended electromagnetic environment. Potential sources of electromagnetic compatibility problems include radio transmitters, power lines, electronic circuits, electric motors, and just about anything that utilizes or can detect electromagnetic energy.

Electronic circuits, equipment, and systems which are sensitive to electromagnetic radiation must be shielded from sources of electromagnetic radiation in order to ensure proper performance. Furthermore, when equipment radiates electromagnetic radiation, the equipment must be isolated, or shielded in order to prevent degradation of the performance of surrounding equipment.

Computers are generally designed and constructed to provide for the installation of supplemental circuit cards that can be mounted in the computer in order to provide a number of different functional options. Supplemental circuit cards are typically designed and constructed with a standard mounting bracket attached to a circuit board. A typical computer chassis has openings to allow the installation of the supplemental circuit cards. However, the openings in the computer chassis increase the potential that unwanted radiation, such as electromagnetic and radio frequency emissions will have a deleterious impact upon the computer.

Shielding, which involves the use of materials to reduce radiation by reflection and/or absorption, is used in many different equipment environments, particularly those in which gaskets are required to seal seams and gaps in housings and door enclosures. Shielding is most effective when the shielding mechanism is suitably placed to cause an abrupt discontinuity in the path of radiation emissions. Additionally, shielding effectiveness and performance is a function of the properties and configuration of the shielding mechanism. Therefore, since one of the largest single sources of radiation emissions or electromagnetic leakage can occur along contact surfaces between two parts, in these situations, it is important to have a shield which is capable of establishing proper contact to ensure that a good conductive seal results.

BRIEF SUMMARY OF THE INVENTION

One embodiment of the present invention provides an electromagnetic shield comprising an electrically conductive frame for establishing electrical contact between a chassis wall and an expansion card mounting bracket. The frame has a plurality of spring fingers interconnected about a perimeter of a central opening in the frame, wherein each spring finger defines a central axis that extends outwardly away from the central opening.

Another embodiment of the invention provides an electromagnetic shielding system comprising a substantially planar chassis wall having an opening through the wall, an expansion card mounting bracket for securing to the chassis wall over the opening, and an electromagnetic shield including an electrically conductive frame disposed between the chassis wall and the mounting bracket to establish electrical contact between a chassis wall and an mounting bracket. The frame has a central opening aligned with the chassis wall opening and a plurality of spring fingers interconnected about a perimeter of a central opening in the frame. Each spring finger defines a central axis that extends outwardly away from the central opening.

DETAILED DESCRIPTION OF THE INVENTION

Figure 1:
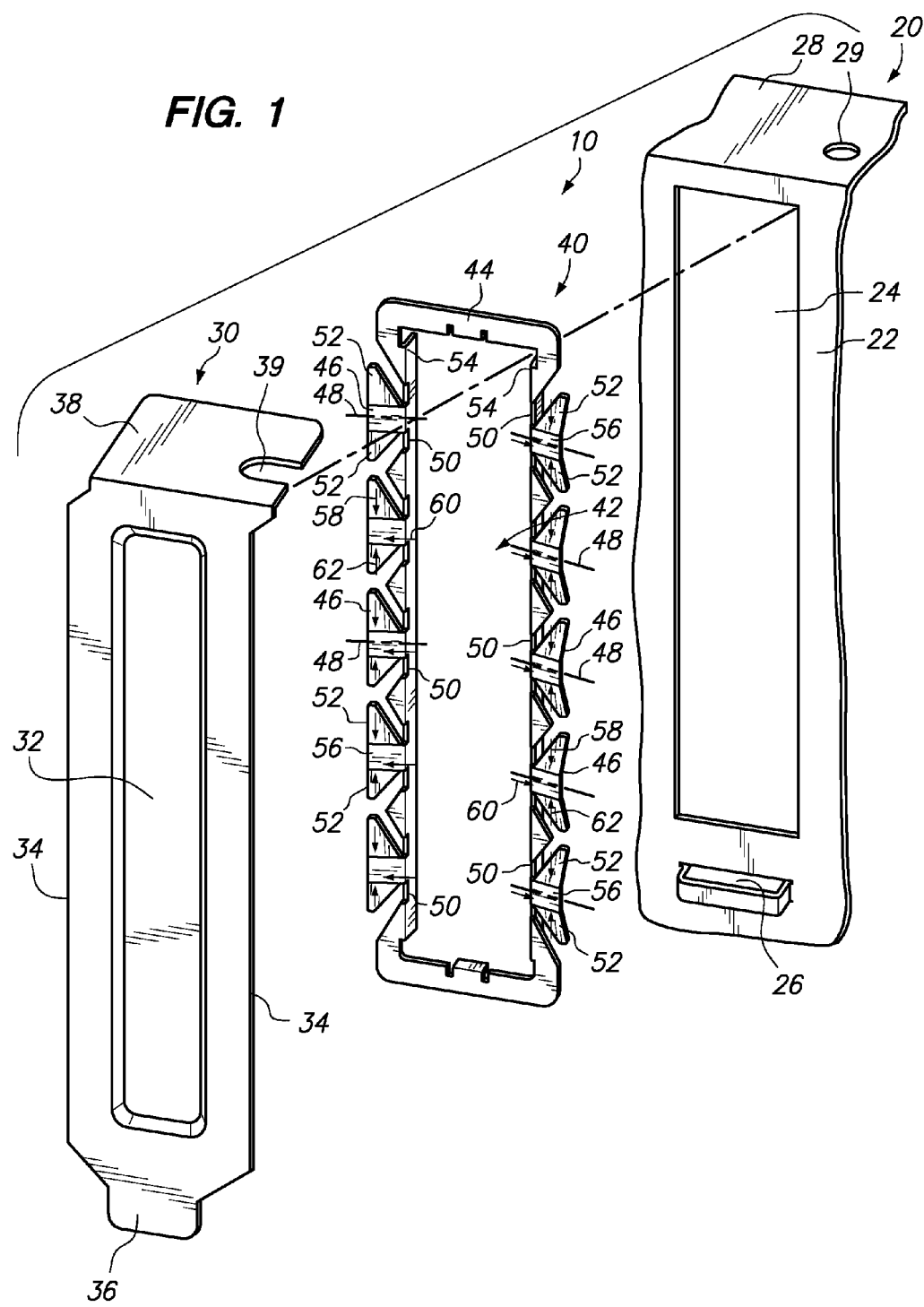
FIG. 1 is an exploded view of an electromagnetic shield aligned for establishing electrical contact between a chassis wall and an expansion card mounting bracket.

One embodiment of the present invention provides an electromagnetic shield comprising an electrically conductive frame for establishing electrical contact between a chassis wall and an expansion card mounting bracket. The frame has a plurality of spring fingers interconnected about a perimeter of a central opening in the frame, wherein each spring finger defines a central axis that extends outwardly away from the central opening.

In another embodiment of the electromagnetic shield, the frame includes a substantially planar portion adjacent the central opening in the frame. Optionally, the substantially planar portion is segmented with various segments collectively defining a plane.

In yet another embodiment of the electromagnetic shield, the plurality of spring fingers incline along the central axis to extend out of the plane defined by the substantially planar portion. The incline of the spring fingers allows a mounting bracket to slide laterally without jamming against the side of a spring finger during installation, removal or side-to-side shifting of the mounting plate. Each of the spring fingers will preferably incline out of the plane at an acute angle.

In a further embodiment, each spring finger will include opposing tabs extending laterally relative to the central axis of the spring finger and each tab will incline toward the plane. The incline of the tabs allows a mounting bracket to slide longitudinally without jamming against the side of a spring finger during installation, removal or side-to-side shifting of the mounting plate.

In a still further embodiment, each spring finger defines a wave plate. A preferred wave plate includes a first portion that inclines along the central axis in a first direction out of a plane defined by the substantially planar portion and second and third portions that incline toward the plane of the frame on opposing sides of the central axis. Such a wave is one example of how a spring finger can present an inclined surface in three directions.

In an additional embodiment, the electromagnetic shield includes a frame that extends along the perimeter of a hole in the chassis. Optionally, the frame will include at least one retaining element that extends into the hole to prevent lateral shifting of the frame. For example, the at least one retaining element may be a sleeve. Alternatively, the at least one retaining element may include at least two retaining elements that extend into the hole along opposing sides of the hole.

Yet another embodiment of the invention provides an electromagnetic shield where the frame is rectangular and the plurality of spring fingers are disposed along opposing sides of the frame. Preferably, the spring fingers on opposing sides of the frame have a central axis extending generally laterally outward. The frame may include a substantially planar portion adjacent the central opening in the frame. Furthermore, the plurality of spring fingers preferably incline along the central axis to extend out of a plane defined by the substantially planar portion. It is also preferable that each spring finger includes opposing tabs extending laterally relative to the central axis and inclined toward the plane. In a specific configuration, the tabs widen with distance from the central opening in the frame. Where the rectangular frame extends along the perimeter of a rectangular hole in the chassis, the frame may include at least a pair of retaining elements that extends into the hole on opposing sides of the frame to prevent lateral shifting of the frame. In a preferred implementation of the electromagnetic shield, each spring finger extends out of the plane for electrical contact with a mounting bracket and has tabs that extend toward the plane for electrical contact with a chassis wall.

It should be recognized that embodiments of the electromagnetic shield preferably provide a plurality of spring fingers that independently flex to achieve contact between the chassis wall and the mounting bracket over a predetermined range of distances or tolerances. Still further, various embodiments of the electromagnetic shield can be made in which the spring fingers are integrally formed with the frame, such as by stamping and bending the shield from a single sheet of metal.

Another embodiment of the invention provides an electromagnetic shielding system comprising a substantially planar chassis wall having an opening through the wall, an expansion card mounting bracket for securing to the chassis wall over the opening, and an electromagnetic shield including an electrically conductive frame disposed between the chassis wall and the mounting bracket to establish electrical contact between a chassis wall and a mounting bracket. The frame has a central opening aligned with the chassis wall opening and a plurality of spring fingers interconnected about a perimeter of a central opening in the frame. Each spring finger defines a central axis that extends outwardly away from the central opening. Other embodiments of the electromagnetic shield, previously described or discussed in relation to the figures below, may be utilized in accordance with the present shielding system.

FIG. 1 is an exploded view of an electromagnetic shielding system 10, including an electromagnetic shield 40 aligned for establishing electrical contact between a chassis wall 20 and an expansion card mounting bracket 30. The portion of the chassis wall 20, shown in FIG. 1, includes a substantially planar wall 22 with a typical opening or slot 22 for receiving and securing an expansion card mounting bracket 30.

The expansion card mounting bracket 30 is configured to cover the slot 24 and preferably overlap the wall 22 around the perimeter of the slot 24. As shown, the mounting bracket 30 includes a central region 32 that is preferably position over the slot 22 and a perimeter region 34 that overlaps the chassis wall 22. Furthermore, a tab 36 at the base of the mounting bracket 30 is adapted to be received in a further slot 26 as the base of the chassis wall. In addition, the mounting bracket 30 includes a flange 38, generally perpendicular to the other regions 32, 34 of the bracket, which overlaps with a flange 28 on the chassis wall 20. A slot 39 in the flange 38 aligns with a threaded hole 29 in the chassis flange 28 so that the mounting bracket 30 can be secured to the chassis wall with a screw (not shown).

The electromagnetic shield 40 includes a central opening 42 and a rectangular frame 44 extending along the perimeter of the rectangular central opening 42. The frame 44 interconnects a plurality of spring fingers 46 disposed along opposing sides of the frame. The spring fingers 46 on opposing sides of the frame 44 have a central axis 48 extending generally laterally outward. The frame may include a substantially planar portion 50 adjacent the central opening 42 in the frame. Furthermore, the plurality of spring fingers 46 will each preferably incline along their central axis 48 to extend out of a plane defined by the substantially planar portion 50 (See also FIG. 3). It is also preferable that each spring finger 46 includes opposing tabs 52 extending laterally relative to the central axis 48 and inclined toward the plane. In a specific configuration, the tabs 52 widen with distance from the central opening 42 in the frame.

The frame 44 also includes a pair of retaining elements 54 that extends into the hole 24 along opposing sides of the frame 44 to prevent lateral shifting of the frame relative to the chassis wall. In a preferred implementation of the electromagnetic shield 40, each spring finger 46 has a central portion 56 extends out of the plane for electrical contact with a mounting bracket 30 and has tabs 52 that extend toward the plane for electrical contact with a chassis wall 22. Accordingly, the spring fingers 46 present an inclined face to movement of the mounting bracket in any of three directions shown by the arrows 58, 60, 62, such that the mounting bracket can be slide over the shield 40 without jamming.

The plurality of spring fingers 46 flex independently and provide multiple contacts between the chassis wall 22 and the mounting bracket 30 over a predetermined range of distances or tolerances. Still further, various embodiments of the electromagnetic shield can be made in which the spring fingers are integrally formed with the frame, such as by cutting and bending the shield from a single sheet of metal.

Figure 2:
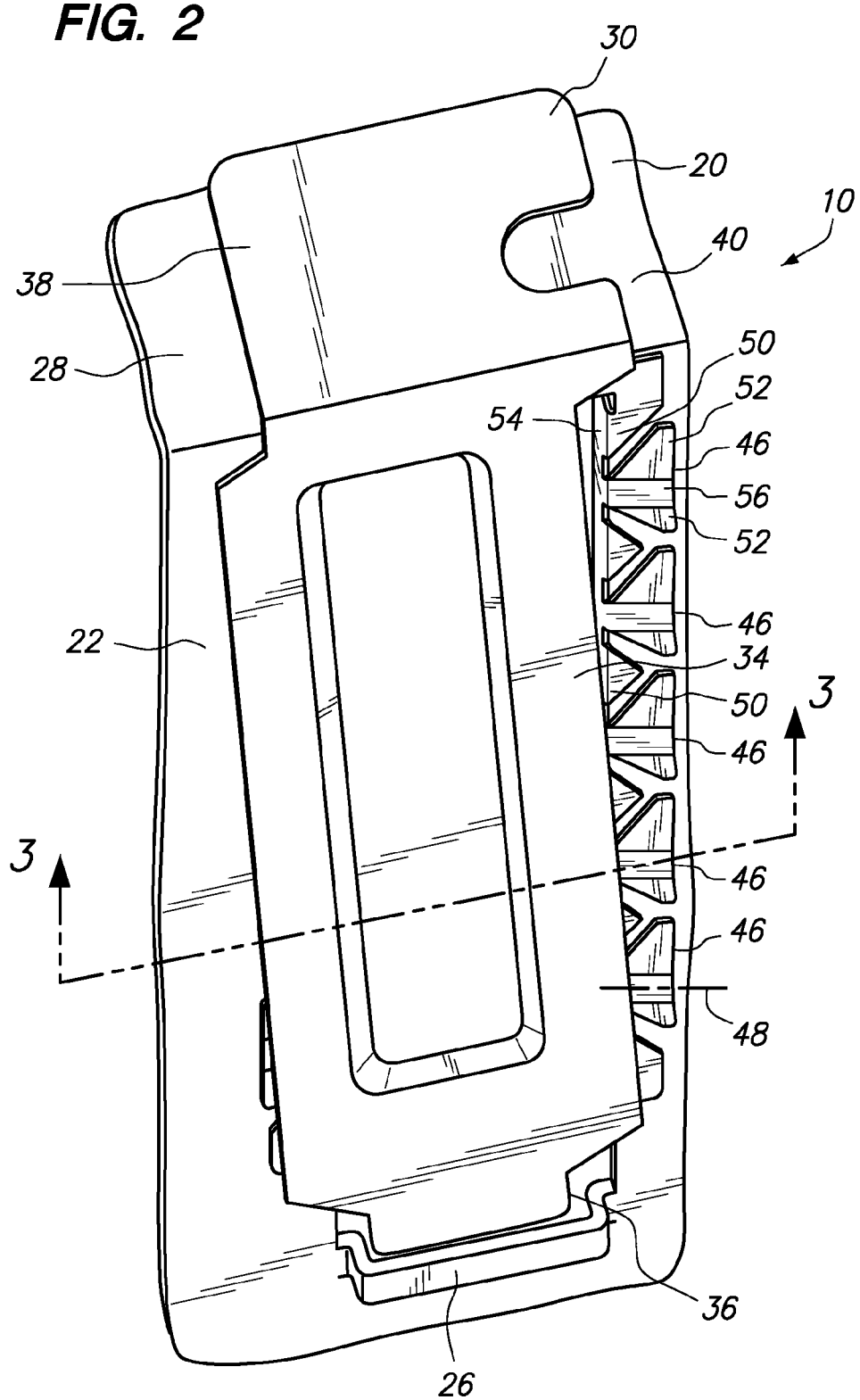
FIG. 2 is a perspective view of electromagnetic shield secured between the chassis wall and the expansion card mounting bracket, wherein the mounting bracket has shifted to one side.

FIG. 2 is a perspective view of the electromagnetic shield 40 secured between the chassis wall 20 and the expansion card mounting bracket 30, wherein the mounting bracket has shifted to one side (laterally to the left as shown in FIG. 2). Accordingly, it is generally necessary to slide the mounting bracket 30 to the right into an upright position so that the perimeter region 34 of the mounting bracket will make contact with each of the five spring fingers 46 on the right side of the shield. Since the spring fingers 46 are inclined along their central axis 48, the right-most edge of the mounting bracket will make contact with the central portion 56 and ride up and over the spring fingers. Accordingly, the spring fingers 46 may be compressed between the mounting bracket and the chassis wall. As shown, the central portion 56 extends out of the plane to contact the mounting bracket and the opposing tabs 52 extend toward the plane to contact the chassis wall. During compression, the spring finger will flex to spread the tabs while maintaining electrical contact between the mounting bracket and the chassis wall. If the bracket is slid downward or upward, the bracket will ride up on one of the inclined tabs 52.

Figure 3:
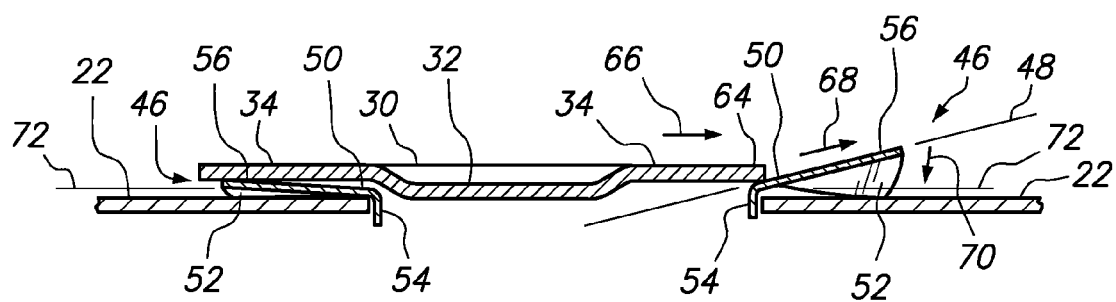
FIG. 3 is a cross-sectional view of the assembly in FIG. 2 showing how the spring fingers allow the mounting bracket to return to an upright position without jamming.

FIG. 3 is a cross-sectional view of the assembly 10 in FIG. 2 showing how the spring fingers 46 allow the mounting bracket 30 to return to an upright position without jamming. The mounting bracket has a right-most edge 64 that contacts the central portions 56 of the spring finger 46 as the bracket 30 is slid to the right (in the direction of the arrow 66). The spring finger 46 on the right-hand side is shown in an uncompressed state, while the spring finger 46 on the left-hand side has already been compressed. Since the cross-section is parallel to the central axis 48 of the spring fingers, FIG. 3 shows how the central portion 56 inclines along its central axis 48 out of the plane 72 defined by the substantially planar portions 50 of the shield. Furthermore, FIG. 3 shows the retaining elements 54 extending into the hole in the chassis wall 22 to prevent lateral movement of the shield relative to the chassis wall.

As the bracket 30 slides further to the right, the bracket 30 will ride up over the spring finger (in the direction of arrow 68) and cause it to flex and compress (in the direction of arrow 70) and provide electrical contact between the bracket 30 and the chassis wall 22. The opposing tabs 52 spread apart as the spring finger flexes.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An electromagnetic shield comprising:
an electrically conductive frame for establishing electrical contact between a chassis wall and an expansion card mounting bracket, wherein the frame has a plurality of spring fingers interconnected about a perimeter of a central opening in the frame, wherein each spring finger defines a central axis that extends outwardly away from the central opening, wherein the plurality of spring fingers incline along the central axis to extend out of a plane defined by a substantially planar portion of the frame, and wherein each spring finger includes opposing tabs extending laterally relative to the central axis and inclined toward the plane.

2. The electromagnetic shield of claim 1, wherein the substantially planar portion of the frame is adjacent the central opening in the frame.

3. The electromagnetic shield of claim 2, wherein the substantially planar portion is segmented.

4. The electromagnetic shield of claim 1, wherein each spring finger inclines out of the plane at an acute angle.

5. The electromagnetic shield of claim 1, wherein the frame extends along the perimeter of a hole in the chassis.

6. The electromagnetic shield of claim 5, wherein the frame further includes at least one retaining element that extends into the hole to prevent lateral shifting of the frame.

7. The electromagnetic shield of claim 6, wherein the at least one retaining element is a sleeve.

8. The electromagnetic shield of claim 7, wherein the at least one retaining element includes at least two retaining elements that extend into the hole along opposing sides of the hole.

9. The electromagnetic shield of claim 1, wherein the frame is rectangular and the plurality of spring fingers are disposed along opposing sides of the frame.

10. The electromagnetic shield of claim 9, wherein the spring fingers on opposing sides of the frame have a central axis extending generally laterally outward.

11. The electromagnetic shield of claim 10, wherein the frame includes a substantially planar portion adjacent the central opening in the frame.

12. The electromagnetic shield of claim 1, wherein the frame extends along the perimeter of a rectangular hole in the chassis and includes at least a pair of retaining elements that extends into the hole on opposing sides of the frame to prevent lateral shifting of the frame.

13. The electromagnetic shield of claim 1, wherein the each spring finger extends out of the plane for electrical contact with the mounting bracket and has tabs that extend toward the plane for electrical contact with the chassis wall.

14. The electromagnetic shield of claim 1, wherein the tabs widen with distance from the central opening.

15. The electromagnetic shield of claim 1, wherein each spring finger presents an inclined surface in three directions.

16. The electromagnetic shield of claim 1, wherein each spring finger allows the mounting bracket to slide laterally without jamming.

17. The electromagnetic shield of claim 1, wherein each spring finger independently flexes to achieve contact between the chassis wall and the mounting bracket over a predetermined range of distances.

18. The electromagnetic shield of claim 1, wherein the plurality of spring fingers are integrally formed with the frame.

19. An electromagnetic shield, comprising:
an electrically conductive frame for establishing electrical contact between a chassis wall and an expansion card mounting bracket, wherein the frame has a plurality of wave plates interconnected about a perimeter of a central opening in the frame, and wherein each wave plate defines a central axis that extends outwardly away from the central opening, and wherein each wave plate includes a first portion that inclines along the central axis in a first direction out of a plane defined by the frame and second and third portions that incline toward the plane of the frame on opposing sides of the central axis.

20. An electromagnetic shielding system, comprising:
a substantially planar chassis wall having an opening through the wall;
an expansion card mounting bracket for securing to the chassis wall over the opening; and an electromagnetic shield including an electrically conductive frame disposed between the chassis wall and the mounting bracket to establish electrical contact between a chassis wall and an mounting bracket, wherein the frame has a central opening aligned with the chassis wall opening, wherein the frame has a plurality of spring fingers interconnected about a perimeter of the central opening in the frame, wherein each spring finger defines a central axis that extends outwardly away from the central opening, wherein the plurality of spring fingers incline along the central axis to extend out of a plane defined by a substantially planar portion of the frame, and wherein each spring finger includes opposing tabs extending laterally relative to the central axis and inclined toward the plane.

\* \* \* \* \*